April 17, 1962 G. LESSMAN 3,030,578
MEASURING DEVICE
Filed July 2, 1959 5 Sheets-Sheet 5

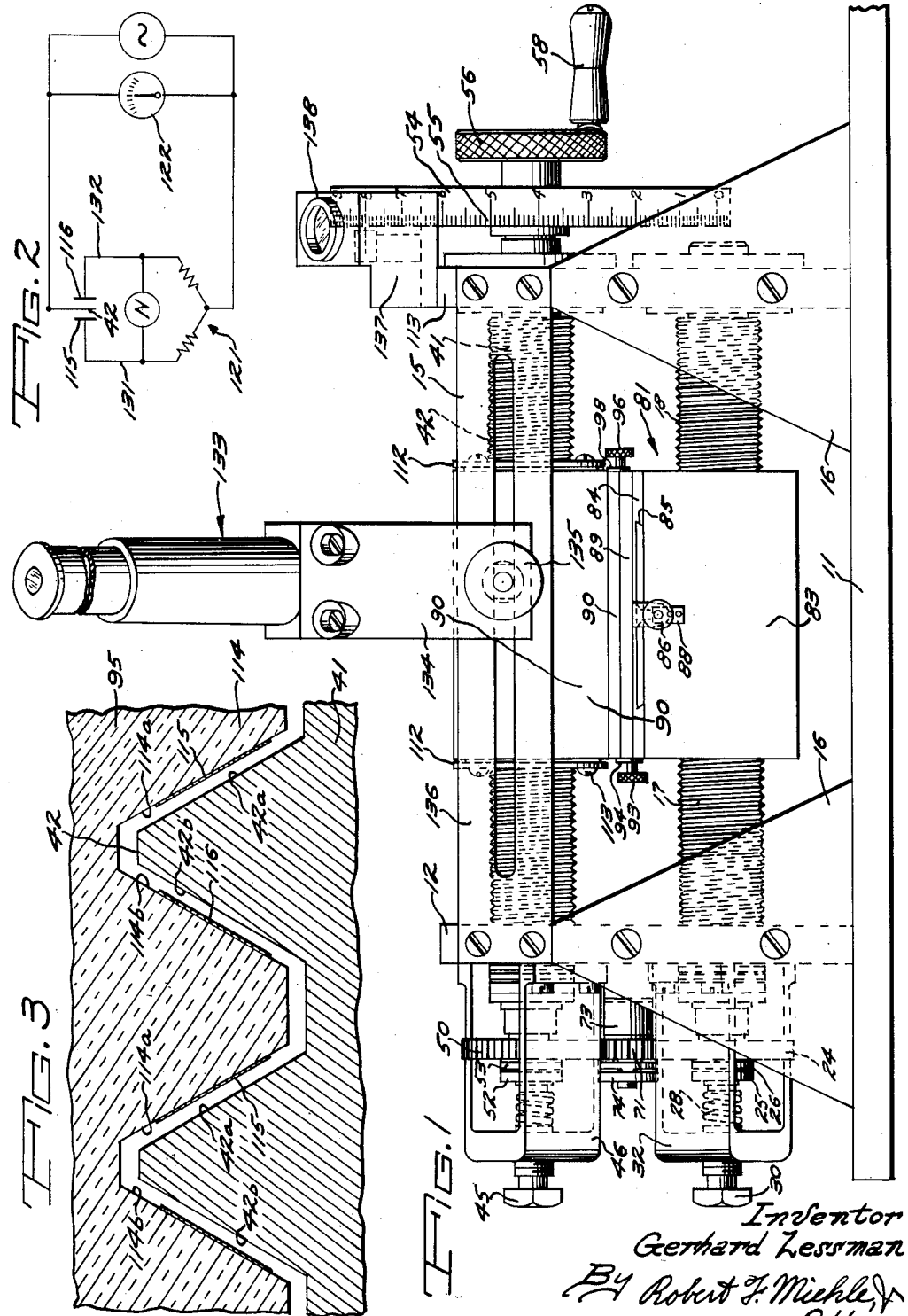

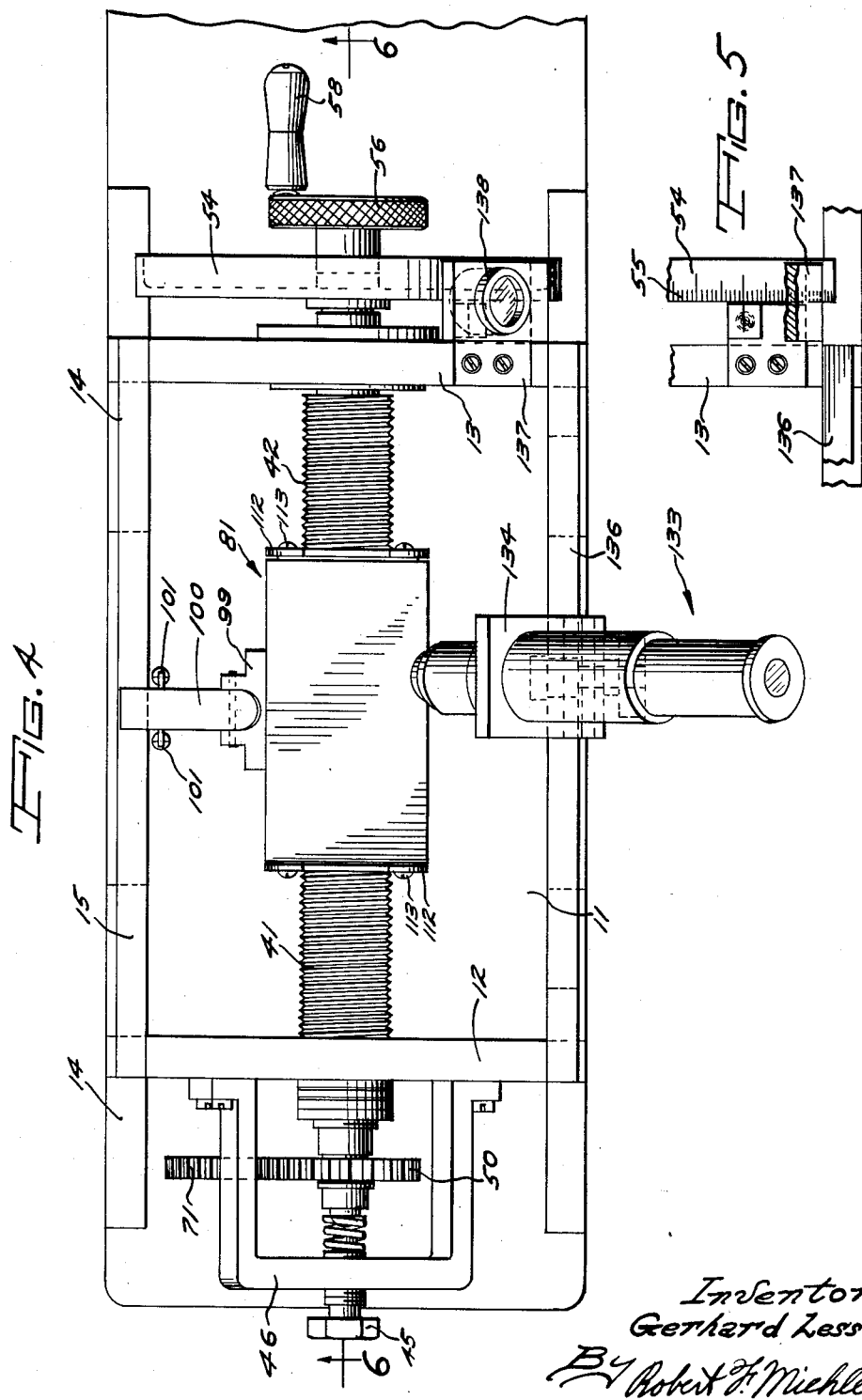

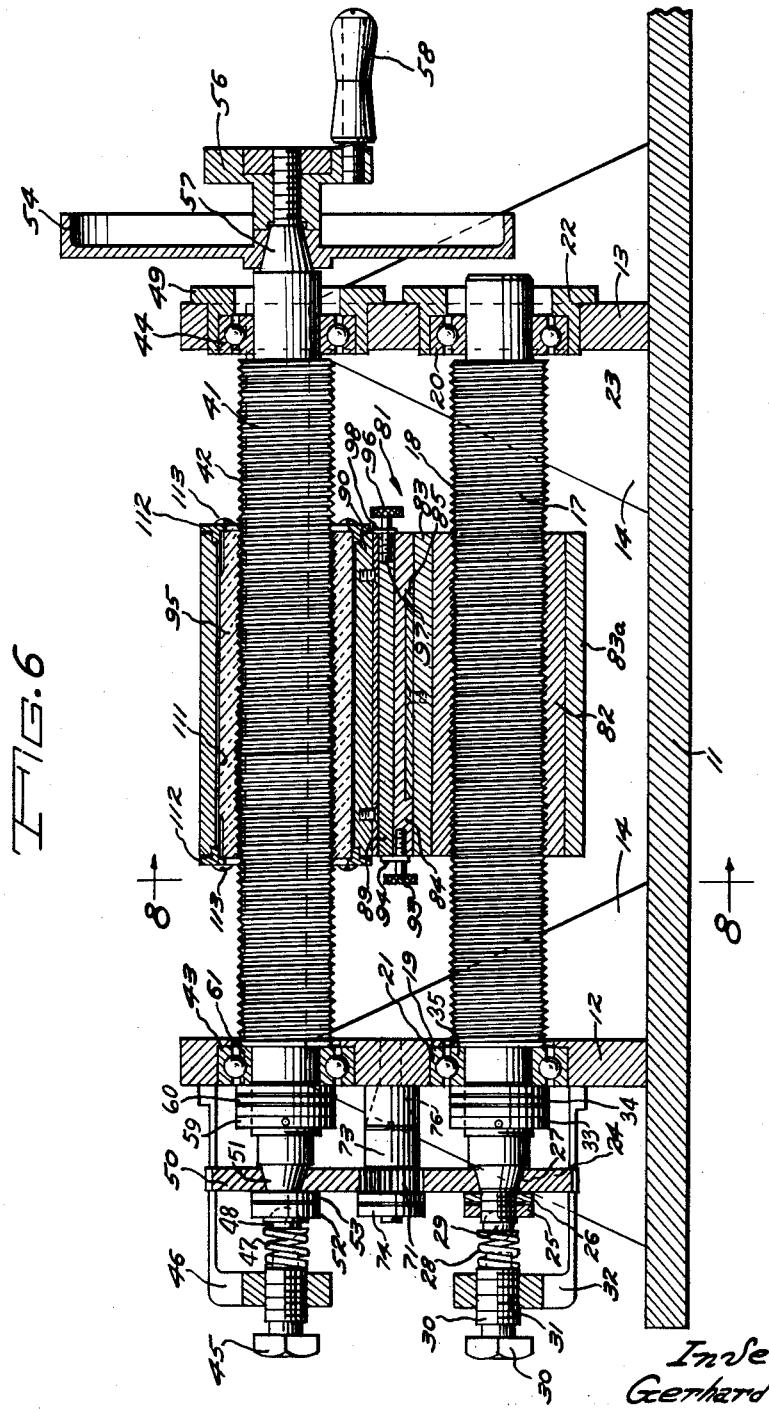

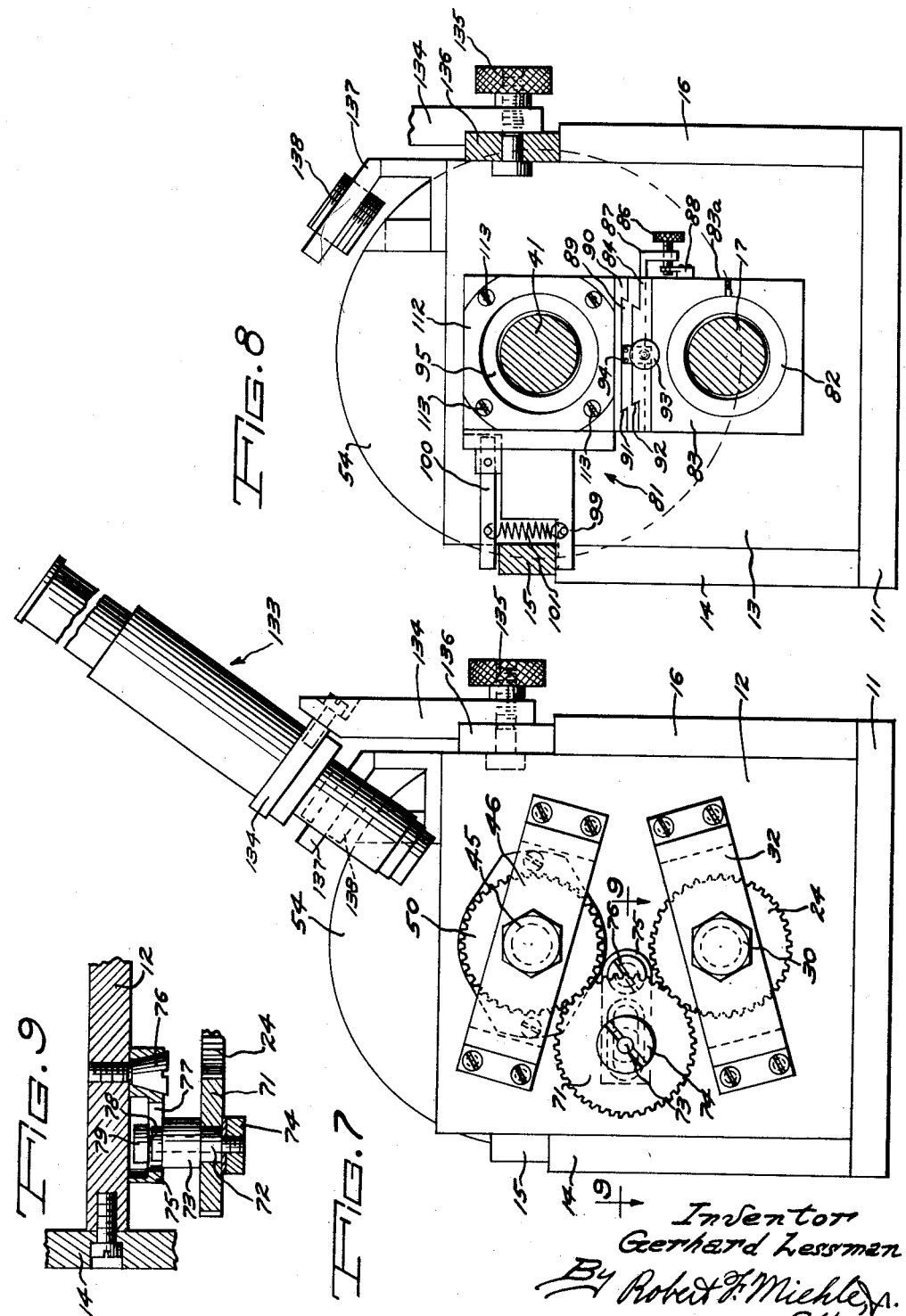

Inventor
Gerhard Lessman
By Robert F. Miehle,
Atty.

United States Patent Office 3,030,578
Patented Apr. 17, 1962

3,030,578
MEASURING DEVICE
Gerhard Lessman, Evanston, Ill., assignor to Bell & Howell Company, Chicago, Ill., a corporation of Illinois
Filed July 2, 1959, Ser. No. 824,665
18 Claims. (Cl. 324—61)

This invention relates to a measuring device, and more particularly to a device for measuring or positioning elements with accuracy of less than one millionth of an inch.

An object of the invention is to provide a very precise measuring device which is simple and rugged in construction.

Another object of the invention is to provide a measuring device provided with a transducer for precisely determining distances.

Another object of the invention is to provide a device which includes a carriage movable by a lead screw and carrying a pair of helical capacitor plates and a measuring screw driven by the lead screw and having a thread between the capacitor plates to form capacitors therewith which may be balanced relative to one another to precisely ascertain the position of the measuring screw relative to the lead screw.

Another object of the invention is to provide a measuring device in which a nut of insulating material is carried by a carriage and has strips of conductive material on opposite sides of a thread thereof and spaced from and bracketing opposite faces of a conductive thread of a measuring screw driven in synchronism with the carriage, the thread and the strips forming capacitors which are included in a bridge circuit to determine the position of the nut relative to the measuring screw.

A complete understanding of the invention may be obtained from the following detailed description of a measuring device forming a specific embodiment thereof, when read in conjunction with the appended drawings, in which:

FIG. 1 is a front elevation view of a measuring device forming one embodiment of the invention;

FIG. 2 is a schematic view of an electrical control circuit forming a part of the measuring device of FIG. 1;

FIG. 3 is an enlarged, fragmentary, sectional view of a portion of the measuring device of FIG. 1;

FIG. 4 is a fragmentary top plan view of the device of FIG. 1;

FIG. 5 is a fragmentary view of a calibrated portion of the measuring device of FIG. 1;

FIG. 6 is a vertical sectional view taken along line 6—6 of FIG. 4;

FIG. 7 is a rear elevation view of the device of FIG. 1;

FIG. 8 is a vertical sectional view taken along line 8—8 of FIG. 6;

FIG. 9 is an enlarged, fragmentary, horizontal sectional view taken along line 9—9 of FIG. 7.

Figure 10:
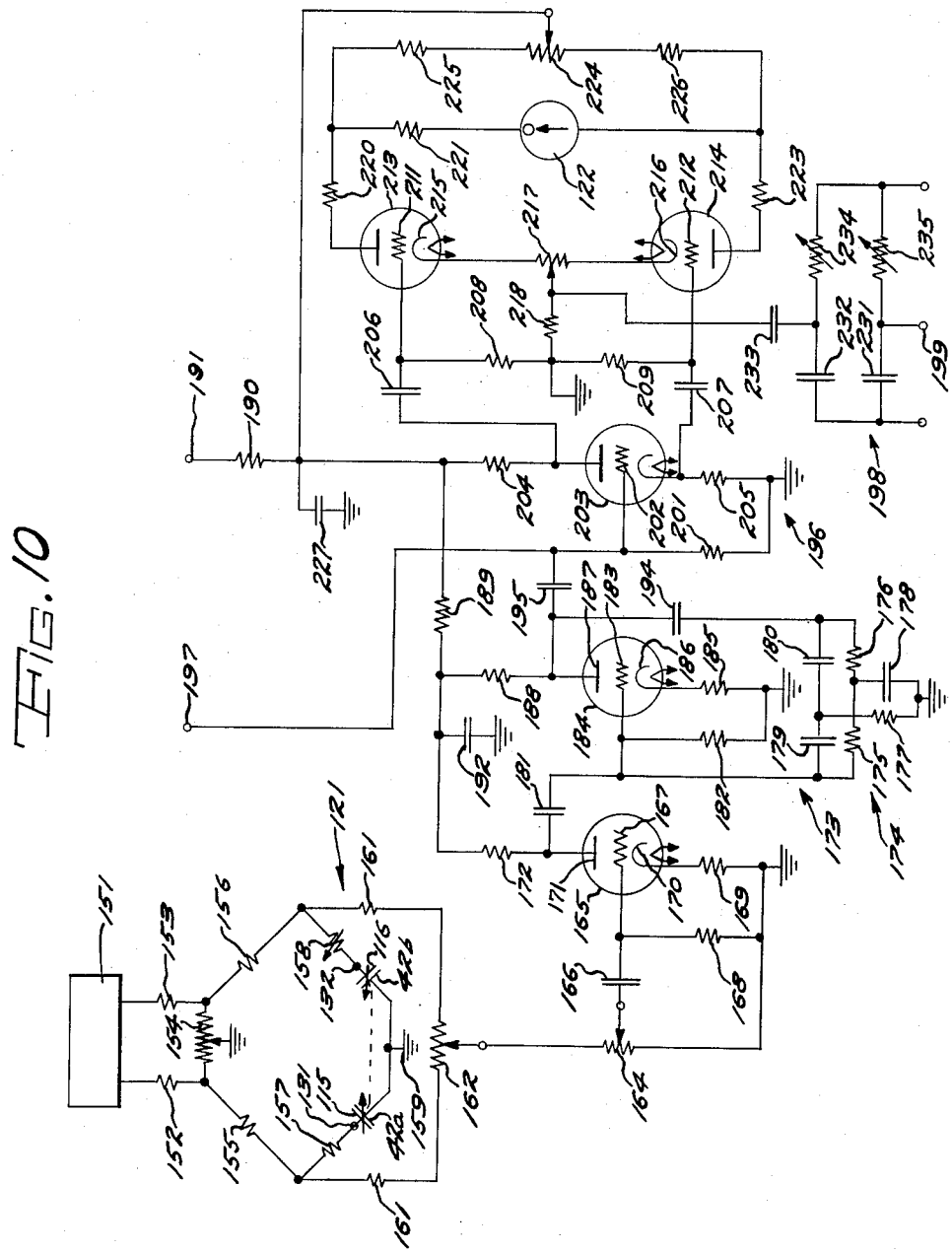
FIG. 10 is a schematic view of a control circuit which may be used interchangeably with the control circuit shown in FIG. 2.

The invention provides a device for locating an object within less than one millionth of an inch. The device includes a carriage movable along a straight line by a drive and a measuring screw extending along the line and rotated in rough synchronism with the drive. A helical capacitor plate is carried by the carriage in a spaced, parallel position relative to one side of the thread of the measuring screw which may be rotated slightly a measured angle relative to the drive of the carriage to bring the capacitance of the capacitor formed by the screw and the plate to a precise value and has a calibrated portion to indicate the precise position of the carriage. Preferably a second helical capacitor plate is carried by the carriage in a position facing and spaced from the opposite side of the thread from the first mentioned capacitor plate to form a second capacitor, and the two capacitors are incorporated in different arms of a bridge circuit which indicates when the capacitances thereof are equal to indicate perfect synchronism between the drive of the carriage and the measuring screw.

Referring now in detail to the drawings, a measuring device shown in the drawings includes a base 11 (FIG. 1) supporting fixedly a pair of braced, vertical bearing supporting plates 12 and 13, rear bracing plates 14, a bracing bar 15 and front bracing plates 16. A drive or main feed screw 17 having a single thread 18 of a predetermined pitch is journaled in radial-and-thrust bearing 19 (FIG. 6) and radial bearing 20 mounted respectively in a counterbored hole 21 in the frame plate 12 and a counterbored bushing 22 in hole 23 in frame plate 13. A gear 24 is locked against rotation relative to the shaft 17 by a nut 25 and a thrust stabilizing washer 26 pressing the gear tightly against a frustroconical portion 27 of the shaft 17. End play of the shaft 17 is taken out by a compression spring 28 seated at one end on an anti-friction ball 29 bearing against the end of the shaft 17 and at the other end on an adjustable screw 30 threaded through a tapped bore 31 in a U-shaped bracket 32 fixed to the frame plate 12. A nut 33 and pressure equalizing washer 34 transmit thrust from the shaft 17 to inner race 35 of the bearing 19. A measuring screw 41 having a single thread 42 of the same pitch as that of the thread 18 is mounted for rotation by bearings 43 and 44 in a position parallel to the screw 17. A screw 45 carried by frame bracket 46 compresses spring 47 bearing against ball 48 to urge the shaft 41 to the right, as viewed in FIG. 6, which eliminates end play of the shaft, the bearing 43 being radial-and-thrust and the bearing 44 being radial only and mounted in bushing 49. A gear 50 identical to the gear 24 is fixed against rotation relative to the shaft 41 by being pressed tightly against frustroconical portion 51 of the the shaft by nut 52 and pressure equalizing washer 53. An edge calibrated wheel or dial 54 having a scale 55 (FIG. 5) on the periphery thereof is keyed to the shaft 41 by a knurled knob 56 (FIG. 6) pressing the dial tightly against a frustroconical portion 57 of the shaft 41. A handle 58 is provided on the knob 56, and the knob is secured against rotation relative to the shaft by tightening it very much on shaft, or, if desired, by a lock washer or set screw (not shown). A nut 59 threaded on the shaft 41 and pressure equalizing washer 60 transmit thrust from the shaft 41 to inner race 61 of the bearing 43.

To connect the shafts 17 and 41 for equal simultaneous rotation in the same direction, an idler gear 71 is provided. The idler gear is adjustably mounted relative to the gears 24 and 50 to provide a predetermined backlash between the shafts 17 and 41 to permit a slight rotation of the measuring shaft 41 relative to the shaft 17 when desired. As best shown in FIGS. 7 and 9, the gear 71 is freely rotatable on reduced end portion 72 of post 73 and is retained thereon by nut 74. The post is adjustably mounted by a slotted mounting arm 75 fixed to plate 12 against movement relative thereto by screw 76. The arm 75 has elongated slot 77 therein into which reduced end 78 of the post projects, and a screw 79 threaded into the post locks the post to the arm 75. It will be readily seen that the post 73 may be adjusted along the slot 77 to provide the desired amount of backlash between the gears 24, 50 and 71.

A carriage 81 (FIG. 6) is movable to the left and right, as viewed in FIG. 6, by selective rotation of the drive screw 17 which extends through a complementary nut 82 of the carriage which is clamped rigidly to lower frame or body 83 of the carriage by a split clamp 83a of the body 83. A wedge 84 is mounted slidably on the body 83 by a dove-tail guide 85 and is adjustable along the guide 83 by an adjustment screw 86 (FIG. 8) threadedly engaging arm 87 of the wedge 84 and held against longitudinal movement by bracket 88 fixed to body 83. A second wedge 89 (FIG. 6) is slidably connected to an upper frame or body 90 and the wedge 84 by dove-tail guide formations 91 and 92 extending parallel to one another and at right angles to the dove-tail guide 85. To adjust the height of the frame 90, a screw 93, which is rotatable in and held against longitudinal movement relative to the wedge 89 by a plate 94 fixed to one end of the wedge, is manually turned and this moves to wedge 89 along the complementary wedge 84 to raise or lower the wedge 89 and frame 90 as desired. Thus, by manipulating the screws 86 (FIG. 8) and 93 (FIG. 6), a nut 95 carried by the frame 90 may be centered relative to the shaft 41. The frame 90 and nut 95 may be manually adjusted longitudinally of the frame 83 and nut 82 by an adjustment screw 96 threaded into tapped bore 97 in the wedge 89 and secured rotatably and against thrust relative to the frame 90 by a thrust plate 98 fixed to the frame 90. The carriage 81 is held against rotational movement by a guide arm 99 (FIG. 8) bearing against the bottom of guide bar 15 and arm 100 pressed against the top of the guide bar 15 by springs 101. The arm 99 is rigidly fastened to the frame 90 and the arm 100 is pivotally mounted on the arm 99.

The nut 95 is mounted in a bore 111 (FIG. 6) in the frame 11 and is clamped to the frame 90 between washer-like plates 112 secured by screws 113 to the ends of the frame 90. The body of the nut 95 is composed of dimensionally stable electrical insulating material, preferably glass, and has a thread 114 (FIG. 3) formed interiorly thereof having the same pitch and general configuration as those of the thread 42 of the screw 41. However, the threads 42 and 114 are different in pitch diameter so that there is a small but complete clearance therebetween. A helical ribbon or capacitor plate 115 is secured on the leading face 114a of the screw-thread 114, and a second helical ribbon or capacitor plate 116 is secured on the trailing face 114b of the thread 114. The ribbons 115 and 116 preferably are metallized deposits on the faces 114a and 114b formed by vapor deposition with suitable masking at the edges of the ribbons during their formation. However, the ribbons may also be preformed ribbons secured to the faces by known adhesives. The outer faces of the ribbons may, if desired, be covered by a thin protective coating of dielectric material but preferably are left exposed. The ribbon 115 on the face 114a of the thread 114 is parallel to and facing rear face 42a of the thread 42, and the ribbon 116 on the face 114b of the thread 114 is parallel to and facing the leading face 42b of the thread 42. The thread 42 is of electro-conductive material, and forms capacitors with the ribbons 115 and 116 and the small air gaps therebetween. The capacitors thus formed are connected into adjacent arms of a bridge circuit 121 shown schematically for clarity in FIG. 2 and disclosed completely in FIG. 10. The threads 42 and 114 are very precise and uniform in their pitch and construction, and to average out any non-uniformity thereof the thread 114 preferably is co-extensive with the thread 42 for a large number of turns, preferably at least one hundred turns. When the threads 42 and 114 are exactly centered throughout the length of the nut 95, the two capacitors are equal in capacitance and the bridge is balanced which is indicated by a zero reading of meter 122. However, if these threads are not centered relative to one another, the bridge will be unbalanced to an extent and direction shown by the meter 122.

The spacing and retaining plates 112 are composed of electrical insulating material, and silver paint on one end of the nut 90 connects one end of the ribbon 115 to a lead 131 mechanically carried at one end by one of the plates 112. Silver paint on the other end of the nut 90 connects the other end of the ribbon 116 to a lead 132 carried by the other plate 112.

A microscope 133 with cross-hairs is secured by a bracket 134 and locking screw 135 to a slotted bar 136, the bracket being slidable along the bar when the screw 135 is loosened. The field of view of the microscope includes an upper part of the carriage 81, which may be provided with means for holding an article thereon which is to be measured. A fixed bracket 137 holds a magnifier 138 with cross-hairs which is shown as a simple magnifying device but may be a microscope.

In FIG. 10, the bridge circuit 121 is shown, and includes an oscillator input 151 supplying an oscillating voltage applied to resistors 152 and 153 connected to a center grounded resistor 154 to form an input balancing network. The resistor 152 is connected to resistor 155 in one arm of the bridge, and resistor 153 is connected to resistor 156 in a second arm of the bridge. Resistors 157 and 158 with the capacitors formed by the elements 42a, 42b, 115 and 116 form the other two arms of the bridge which are grounded at their junction point 159. The resistors 155 and 157 are connected at their junction to resistor 161, which is connected at its other end to a trimming resistor 162. Resistor 161 connects the junction of resistors 156 and 158 to the other end of resistor 162, and variable resistor 164 connects the tap of resistor 162 to grid 167 of amplifier tube 165 through capacitor 166. Grounded resistors 168 and 169 connect cathode 170 to the input of the tube and plate 171 is connected to an output resistor 172 and to a negative feed-back stage 173, which has a T network 174 tuned to permit only the frequency of the oscillator 151 to be amplified. The network 174 includes equal resistors 175 and 176, resistor 177, capacitor 178 and equal capacitors 179 and 180. Capacitor 181 and resistor 182 form an input network to grid 183 of tube 184. Resistor 185 is connected between ground and cathode 186. Plate 187 is connected to a B+ terminal 191 through resistors 188, 189 and 190. The resistor 189 also is connected to the resistor 172 by a connection connected to a capacitor 192 grounded at one side. Capacitor 193 connects the plate 187 to the network 174. Capacitor 195 connects the plate 187 to a discriminator circuit 196 of known construction and to a terminal 197 which may be connected to the vertical deflection plates of an oscilloscope. The discriminator applies its output to the meter 122 and has a network 198 supplied with the oscillating voltage output of the oscillator 151 as is well known in the art. The network 198 includes a terminal 199 adapted to supply voltage to the horizontal deflecting plates of the oscilloscope when the terminal 197 is connected to the vertical deflection circuit thereof. The discriminator has a resistor 201 forming a part of the input network to grid 202 of tube 203. The output of tube 203 is provided by resistors 204 and 205 and is supplied by capacitors 206 and 207 and grounded resistors 208 and 209 to grids 211 and 212 of tubes 213 and 214 connected in push-pull relationship. Cathodes 215 and 216 are connected by center-tapped resistor 217 connected by resistor 218 to ground. Plate 219 of the tube 213 is connected by resistors 220 and 221 to one side of meter 122, and plate 222 is connected by resistor 223 to the other side of the meter. Center tapped variable resistor 224 connects resistor 190 to equal resistors 225 and 226 connected to the plate resistors 220 and 223. Capacitor 227 is connected between ground and the resistors 190 and 224. The network 198 includes capacitors 231, 232 and 233 and variable resistors 234 and 235.

In operating the device described above, an article to be measured is clamped to the carriage in the field of view of the microscope 133. The screw 41 then is turned by manually driving it through the handle 58, and drives, through the back-lash gear connection, the drive screw 17 to move the carriage 81 relative to the microscope until a desired point on the article is brought into alignment with the cross-hairs of the microscope. Then the screw 41 is backed off, as permitted by the back-lash, until each turn of the thread 42 is centered relative to the corresponding portion of the thread 114 which is indicated by a zero reading of the meter 122. Then the reading by the magnifier of the dial 54 is taken and recorded, after which the drive screw 17 is driven until a second desired point on the article is aligned with the cross-hairs of the microscope, the number of turns of the knob 56 being counted, by a counter (not shown) if desired. The screw 41 then is again backed off until the meter 122 indicates that the two opposed capacitors formed by the ribbons 115 and 116 and the thread 42 are equal, and the setting of the dial is read through the magnifier. The difference between the two settings of the dial plus the number of turns of the screw 17 times the pitch of the screw then gives the distance between the two points to within less than one millionth of an inch.

The carriage 81 also may be used to carry a tool to be used with a machine tool and vary the position of the tool precisely for very precise work. The lead screw 17 and nut 82 may be of standard types which are not uniform or precise throughout the lengths thereof, and the threads 114 and 42 are rather precise. However, while the back-lash in the drive connection between the two screws 17 and 41 is made sufficient that the capacitor effect is always over center during driving of the screw 17 through the screw 41 so that the screw 41 can be brought back to its center or null point, the back-lash is always insufficient to permit contact between the thread 42 and either the ribbon 115 or the ribbon 116 so that no wear or damage to these elements occurs. If desired, the drive screw 17 may be driven directly by putting a handle mechanism thereon and a servo-mechanism added to move the measuring screw 41 within the limits provided by the back-lash connection between the screws 17 and 41. The servo-mechanism would be controlled by the bridge circuit described above in a known manner to drive the screw 41 toward the null point whenever the two capacitors formed by the thread 42 and ribbons 115 and 116 are not equal. With this construction, the measuring screw is automatically brought to thread centering position relative to the nut 95.

In a constructed embodiment of the invention, the following constants and structural details were used, and these are given merely by way of example and are not intended to limit the invention in any way:

| | |
|---|---|
| Oscillator 151 | 1300 cycles per second. |
| Resistor 152 | 22 kilohms. |
| Resistor 153 | 22 kilohms. |
| Resistor 154 | 20 kilohms. |
| Resistor 155 | 240 kilohms. |
| Resistor 156 | 240 kilohms. |
| Resistor 157 | 5 kilohms. |
| Resistor 158 | 5 kilohms. |
| Resistor 161 | 1.2 megohms. |
| Resistor 162 | 100 kilohms. |
| Resistor 163 | 1.2 megohms. |
| Resistor 164 | .5 megohms. |
| Resistor 168 | 8.2 megohms. |
| Resistor 169 | 3.3 kilohms. |
| Resistor 172 | 270 kilohms. |
| Capacitor 166 | .005 microfarads. |
| Tubes 165 and 184 | 12AX7 |
| Capacitor 178 | .001 micro-microfarads. |
| Capacitor 179 | 500 micro-microfarads. |
| Capacitor 180 | 500 micro-microfarads. |
| Capacitor 181 | .001 microfarads. |
| Capacitor 194 | .01 microfarads. |
| Capacitor 195 | .0033 microfarads. |
| Resistor 175 | 270 kilohms. |
| Resistor 176 | 270 kilohms. |
| Resistor 177 | 120 kilohms. |
| Resistor 182 | 8.2 megohms. |
| Resistor 185 | 2.5 kilohms. |
| Resistor 188 | 270 kilohms. |
| Resistor 189 | 15 kilohms. |
| Resistor 190 | 1200 ohms. |
| Resistor 201 | 1 megohm. |
| Resistor 204 | 47 kilohms. |
| Resistor 205 | 47 kilohms. |
| Tubes 203, 213 and 214 | 12AU7 |
| Capacitor 206 | .003 microfarads. |
| Capacitor 207 | .003 microfarads. |
| Capacitor 227 | 30 microfarads. |
| Capacitor 192 | 30 microfarads. |
| Capacitor 231 | .0033 microfarads. |
| Capacitor 232 | .1 microfarads. |
| Capacitor 233 | .0033 microfarads. |
| Resistor 208 | 1 megohm. |
| Resistor 209 | 1 megohm. |
| Resistor 217 | 1 kilohm. |
| Resistor 218 | 3.9 kilohms. |
| Resistor 220 | 10 kilohms. |
| Resistor 221 | 10 kilohms. |
| Resistor 223 | 10 kilohms. |
| Resistor 224 | 5 kilohms. |
| Resistor 225 | 10 kilohms. |
| Resistor 226 | 10 kilohms. |
| Resistor 234 | 15 kilohms. |
| Resistor 235 | .5 megohms. |

For a more complete understanding of the measuring circuit shown in FIG. 10, reference may be had to copending application Serial No. 824,607, filed July 2, 1959, by Castle W. Curtis and assigned to the common assignee.

While the invention is thus described, it is not wished to be limited to the precise details described, as changes may be readily made without departing from the spirit of the invention.

What is claimed is:

1. In a device of the class described, a carriage, means for moving the carriage along a predetermined path, a measuring screw having an electro-conductive thread and extending parallel to said path, means for driving the screw in synchronism with the moving means with a predetermined lost motion therebetween, helical conductive ribbon means carried by the carriage and forming capacitor means with the thread varying as the relative positions of the thread and the ribbon means vary, and means responsive to the capacitor means as determined by the relative position of the thread and the helical means for indicating the relative positions of the thread and the helical means.

2. In a device of the class described, a drive screw having an unprecisely uniform thread, carriage means movable by the thread of the screw, a measuring screw having a precisely uniform electro-conductive thread extending parallel to the drive screw, a pair of electro-conductive helical ribbons carried by the carriage means in positions bracketing opposite sides of the electro-conductive thread and forming capacitors therewith, means drivingly inter-connecting the screws and providing a predetermined back-lash therebetween for rotating the screws in synchronism, means for driving one of the screws to rotate the drive screw to move the carriage, means for rotating the measuring screw relative to the drive screw within the limits permitted by said back-lash, means indicating the position of the measuring screw, and electrical means for indicating when the capacitances of the capacitors are equal.

3. In a device of the class described, a drive screw, a measuring screw parallel to the drive screw and having a thread having electro-conductive opposite faces, a nut having at least a thread portion of dielectric material and of the same pitch as that of the thread of the measuring screw and substantially larger in diameter than that of the thread of the measuring screw, carriage means driven by the drive screw and carrying the nut in axial alignment with the measuring screw, a pair of conductive strips on opposite faces of the thread portion of dielectric material and spaced from opposite sides of the measuring screw thread to form capacitors therewith, adjustable means drivingly inter-connecting the screws, means for sensing when the capacitances of the capacitors are equal, and means responsive to the rotational position of the measuring screw to indicate the position of the carriage.

4. In a measuring device, a rotatable measuring screw having a thread of electro-conductive material, nut means having a dielectric thread of the same pitch as and greater pitch diameter than that of the thread of the screw and interleaving the thread of the screw, means mounting the nut means co-axially relative to the screw, a pair of conductive plates extending along opposite faces of the dielectric thread and spaced from the opposite faces of the screw thread to form capacitors therewith, means for moving the nut and turning the screw in such synchronism with the movement of the nut as to keep the plates out of contact with the screw thread and to permit slight decentering of the screw thread relative to the plates, and electrical measuring means connected to the screw and the plates for sensing such decentering from the relative capacitances of the capacitors.

5. In a measuring device, nut means having an internal thread of dielectric material and having a predetermined pitch and a predetermined pitch diameter, a pair of electro-conductive ribbons adhered to and extending along opposite faces of the nut means, a measuring screw having an electro-conductive thread having the same pitch as and a substantially lesser pitch diameter than the thread of the nut means, the thread of the screw extending into the space between the ribbons and being spaced from the ribbons and the nut means, means for moving the nut means co-axially along the measuring screw and rotating the screw in synchronism with the movement of the nut means to keep the thread of the screw out of contact with the ribbons, bridge means for comparing the capacitances of the ribbons and the thread of the screw to sense when the thread of the screw is centered between the ribbons, and means for moving one of the screw and the nut means relative to the other to center the thread of the screw relative to the ribbons.

6. In a measuring device, a measuring screw having an electro-conductive thread having a predetermined pitch and a predetermined pitch diameter, nut means including a thread of dielectric material of the same pitch as that of the thread of the screw and of a substantially larger pitch diameter than that of the thread of the screw, the nut means being mounted co-axially on the screw, the thread of the screw and the thread of the nut overlapping one another a substantial distance, a pair of helical capacitor plates on the opposite faces of the thread on the nut means, means for moving the nut means along the axis of the screw, means for rotating the screw in timed relation to the movement of the nut means to maintain the screw thread out of engagement with the capacitor plates, means for centering the thread of the screw between the capacitor plates to form capacitors of equal capacitances with the thread of the screw, and circuit means connected to the thread of the screw and the capacitor plates for sensing when the capacitances are equal.

7. The device of claim 6 wherein the capacitor plates are platings on the faces of the thread of the nut means.

8. In a measuring device, a nut of dielectric material having a thread therein, a measuring screw rotatable on a predetermined axis in the nut and having an electro-conductive thread of a pitch the same as that of the nut thread and a pitch diameter substantially less than that of the nut thread with the threads interleaving one another a substantial distance and being spaced from one another, means for moving the nut axially of the screw and rotating the screw in synchronism with the movement of the nut, a pair of helical electro-conductive capacitor plates of equal width and length on opposite faces of the nut thread forming capacitors with adjacent faces of the screw thread, and bridge circuit means connecting the capacitors in different bridge arms for sensing when the capacitors are equal.

9. In a measuring device, a feed screw, a measuring screw parallel to the feed screw and having an electro-conductive thread, means for rotating the measuring screw, adjustable gear means for drivingly inter-connecting the screws with adjustable back-lash therebetween, carriage means including a nut meshing with the feed screw and sensing means spaced from opposite faces of the thread of the measuring screw to form a pair of capacitors therewith, means connected electrically to the electro-conductive thread and the sensing means for indicating when the capacitors are equal, and measuring means for indicating the rotational position of the measuring screw.

10. In a measuring device, a drive screw, a measuring screw having an electro-conductive thread and mounted rotatably parallel to the drive screw, a dielectric nut fitting loosely on the measuring screw, a pair of capacitor ribbons mounted in the nut in positions facing opposite faces of the thread of the measuring screw and spaced therefrom to form capacitors therewith, bridge circuit means connected to the capacitors for sensing equal capacitances of the capacitors to indicate centering of the measuring screw thread relative to the capacitor ribbons, a dial rotated with the measuring screw, a gear connection between the screws to rotate the screws in synchronism with each other, carriage means movable by the drive screw and carrying the nut, magnifying means for reading the dial, and magnifying means positioned along the path of movement of the carriage.

11. The device of claim 10 wherein the gear connection includes a pair of gears on the screws and an idler gear meshing with gears, and means mounting the idler gear adjustably relative to the pair of gears to adjust back-lash therebetween.

12. The device of claim 10 and including a guide parallel to the screws and follower means carried by the carriage in engagement with the guide for holding the carriage against rotation.

13. In a device of the type described, carriage means, drive means for moving the carriage means in a predetermined direction, an elongated measuring screw rotatable on an axis extending in said direction and having an exterior thread provided with side walls spaced from one another and electroconductive at the faces thereof, the thread of the screw having a predetermined pitch and a predetermined pitch diameter, a measuring nut having an internal thread including a pair of electro-conductive facings forming the side walls thereof and electrical insulating means supporting the facings to insulate them one from one another, the thread of the measuring nut interleaving the thread of the measuring screw and having a pitch the same as that of the measuring screw and a pitch diameter greater than that of the screw by an amount such that the apex of each thread is spaced from the root of the other thread and the threads interleave with one another when the threads are centered relative to one another, the threads being of such thicknesses that the facings of the nut are spaced from the side walls of the thread of the screw when the threads are centered relative to one another, means supporting the measuring nut coaxially on the measuring screw and connecting the nut to the carriage means for movement along the screw by the carriage means as the carriage means is moved by the drive means, means responsive to the drive means for rotating the measuring screw in synchronism with movement of the carriage means such that the threads of the screw and the nut are kept out of contact with one another but the spacings between the facings of the nut and faces of the screw thread vary, and bridge circuit means connected electrically to the facings and the screw for sensing variations in the spacings between the facings and the faces of the screw threads.

14. In a device of the type described, a feed screw, means for rotating the feed screw, a drive nut movable by the feed screw, a measuring screw rotated by the feed screw and having a helical groove provided with side walls spaced from one another and having electroconductive facings, a measuring nut moved along the measuring screw by the drive nut and having a helical thread projecting into the helical groove, the side walls of said helical thread having electroconductive facings insulated from one another and spaced from the facings of the measuring screw to form a pair of capacitors therewith, and means connected to the facings for sensing differences in the capacitances of the capacitors.

15. In a measuring device, a drive screw, a measuring screw parallel to the drive screw, means for rotating the drive screw and the measuring screw in synchronism, carriage means having a feed nut in driving engagement with the drive screw, a measuring nut fitting loosely on the measuring screw with the thread portions of the measuring nut and the measuring screw interleaving and spaced from one another, the measuring nut having a pair of electrically insulated electroconductive facings on opposite sides of the thread thereof, the measuring screw having electroconductive surface portions of the opposite sides of the thread thereof interleaving the facings on the measuring nut to form a pair of capacitors therewith, adjustment means connecting the measuring nut rigidly to the carriage means for adjusting the measuring nut relative to the measuring screw and the carriage means, and electrical bridge circuit means connected to the facings of the measuring nut and the measuring screw for sensing unbalance between the pair of capacitors.

16. In a device of the type described, a feed screw, a drive nut on the feed screw, a measuring screw having a thread of which at least the side faces of the thread are electroconductive, the thread of the measuring screw having a predetermined pitch and a predetermined pitch diameter, means mounting the feed screw and the measuring screw rotatably on axes extending in the same direction, a measuring nut on the measuring screw and having a thread including electroconductive facings on the opposite faces of the thread thereof, the thread of the measuring nut having a larger pitch diameter than that of the thread of the measuring screw and also having the same pitch as that of the thread of the measuring screw, and the threads interleaving one another and spaced laterally from one another so that the adjacent side faces of the threads form a pair of capacitors, adjustable means connecting the drive nut and the measuring nut together for movement together and serving to adjust the measuring nut along the measuring screw, means for rotating the screws in synchronism such that the drive screw moves the drive nut therealong and the drive nut moves the measuring nut along the measuring screw at a rate such that the threads of the measuring nut and measuring screw do not contact one another, and bridge circuit means connected to the capacitors for sensing unbalance therebetween.

17. In a device of the type described, a measuring screw mounted for rotation about its axis, a carriage mounted for movement axially of said measuring screw, a measuring nut mounted on said carriage for movement therewith and having its thread arranged in threaded relation with the thread of said screw and said threads having definite space providing longitudinal clearance therebetween, the faces of said threads comprising electrical conductive material, insulating material electrically isolating the faces of one of said threads from each other whereby the opposing faces of said threads constitute capacitances when spaced from each other as provided by said clearance, means connecting said carriage and said nut for adjusting said carriage and measuring nut axially of said measuring screw and rotating said measuring screw in synchronism and normally maintaining uniform spacing between the faces of said threads but subject to variance of said spacing incident to tolerance variations of said adjusting means, and bridge circuit means including said capacitances for sensing variations of the spacing of the faces of said threads.

18. In a device of the type described, a measuring nut of a predetermined length having an internal thread of a predetermined pitch and forming a helical groove between adjacent turns of the thread, the side wall faces of the thread being electroconductive, drive means for moving the nut linearly along its longitudinal axis with substantial but imperfect accuracy in the longitudinal movement, a measuring screw extending along the longitudinal axis of the nut and threaded through the nut, the measuring screw having a thread of the same pitch as that of the thread of the nut and electroconductive side wall faces, each of the side wall faces of the thread of the screw being parallel to the side wall face of the nut adjacent thereto, means mounting the screw rotatably on said axis, the widths of the thread of the screw and the groove of the nut being such that the side wall faces of the thread of screw are spaced from the side wall faces of the thread of the nut through a predetermined range of relative longitudinal movement between the nut and the screw, means electrically insulating the pair of side wall faces of one of the nut and the screw from one another and from the side wall faces of the other of the nut and the screw so that the adjacent side wall faces of the nut and the screw form a pair of capacitors, means responsive to the drive means for rotating the screw in such synchronism with the longitudinal movement of the nut that while the nut is moved precisely the threads of the nut and screw are centered longitudinally relative to one another and while there is any inaccuracy in the longitudinal movement of the nut the threads are de-centered relative to one another, and bridge circuit means electrically connected to the facings for sensing de-centering of the threads from changes in capacitances of the pair of capacitors.

References Cited in the file of this patent
UNITED STATES PATENTS

| | | |
|---|---|---|
| 2,611,964 | Buisson | Sept. 30, 1952 |
| 2,612,697 | Mathson | Oct. 7, 1952 |
| 2,769,969 | Comstock | Nov. 6, 1956 |